United States Patent [19]

Bradley et al.

[11] 3,933,308

[45] Jan. 20, 1976

[54] SOLUBILIZING AND DISPENSING MATERIAL

[76] Inventors: William S. Bradley; James F. Lea, Jr.; Robert L. Macy, all of 2216 Ridgecrest Drive, Richardson, Tex. 75080

[22] Filed: Sept. 16, 1974

[21] Appl. No.: 506,222

[52] U.S. Cl. ................... 239/10; 239/226; 239/310
[51] Int. Cl.² ......................................... B05B 17/04
[58] Field of Search ............ 239/226, 10, 310, 311, 239/315, 316, 317, 314, 468, 233

[56] References Cited
UNITED STATES PATENTS

| | | |
|---|---|---|
| 811,749 | 2/1906 | Soners .......................... 239/317 X |
| 1,847,406 | 3/1932 | McArdle ........................ 239/315 X |
| 2,519,738 | 8/1950 | Butler ................................ 239/468 |
| 2,737,414 | 3/1956 | Wenzel ............................. 239/317 |
| 2,787,499 | 4/1957 | Rolston .......................... 239/226 X |
| 3,351,290 | 11/1967 | Baldwin .......................... 239/317 X |

*Primary Examiner*—John J. Love
*Attorney, Agent, or Firm*—James D. Olsen

[57] ABSTRACT

Method and apparatus for solubilizing and dispensing material such as fertilizer and other lawn, garden and agricultural chemicals by use of a spherical container having a tangential inlet, a liquid diffusing outlet and means for filling the container with such material.

10 Claims, 5 Drawing Figures

SOLUBILIZING AND DISPENSING MATERIAL

BACKGROUND OF THE INVENTION

The invention relates to solubilizing and spreading materials especially lawn, garden and agricultural chemicals.

The predominant procedure presently used for spreading fertilizer on home lawns is to place a portion of a bag of particulate fertilizer in a wheeled hopper having a rotational metering device for dispensing the fertilizer by gravity. These fertilizer spreaders are usually metallic and therefore short lived due to the corrosive action of the fertilizer in contact with the spreader's metal parts. Unless the spreader is thoroughly cleaned after each use the grate-like metering device will become so rusted that the spreader can no longer be used effectively. A well-made metallic fertilizer spreader is fairly expensive especially in light of the short life of the spreader. In addition to the short life of the wheeled fertilizer spreader extensive time and effort must be expended to load the spreader and deliver the fertilizer to the various parts of a lawn. In addition, most fertilizers must then be watered in, requiring proper placement of hoses and time consuming movement of the hoses to provide water coverage for the entire lawn. The watering aspect of the fertilization process can be partially overcome by utilizing a large number of hoses and sprinklers presuming there are sufficient hydrants available.

Attempts have been made to obviate the difficulties involved in applying fertilizer to home lawns. Service companies are generally available in urban areas which use liquid fertilizer disposed under pressure. Although this process is somewhat less time consuming, the procedure is labor intensive and equipment life may be short lived and require a high maintenance effort.

Solid cake fertilizer has been used for feeding trees and shrubs. The solid fertilizer is normally positioned such that water will pass over the solid, solubilizing the caked fertilizer's exterior surface, and is normally directed beneath the ground by a long slender tube having a valved lower opening. Such devices perform fairly satisfactorily, however, their use is limited to very localized areas.

U.S. Pat. No. 2,563,961 describes apparatus for applying solid cake fertilizer through a rotary sprinkler. This device suffers from the disadvantages of the high cost of solid cake fertilizer and the limited space available for containing the fertilizer. Because of the limited fertilizer space the sprinkler presumably would have to be relocated fairly often.

U.S. Pat. No. 3,165,114 describes a dispensing package where fertilizer is heat sealed in a flexible plastic material. Water is passed through the interior of the package which mixes and solubilizes the fertilizer prior to its exit from the bag. It is extremely doubtful that such a device could withstand the high pressures inherent in city water systems. A pressure reduction manifold would be necessary for its use which would make its cost prohibitive.

In addition to the problems present in spreading fertilizer there are other difficulties with dispensing lawn, garden and agricultural chemicals such as insecticides, herbicides and soil conditioners. Generally these materials are dispensed through hose end sprayers, pressurized container sprayers and hand pumps. Each of these methods are hazardous due to the proximity of the operator to the dispensing device. The operator is exposed to contact with the chemicals which can injure sensitive membranes. If excessive contact occurs, as in windy conditions, serious injury can result.

It is therefore the object of the present invention to provide a new and improved method and apparatus for distributing materials for lawn and garden care as well as general agricultural use.

SUMMARY OF THE INVENTION

The invention includes apparatus for solubilizing and dispensing certain materials. The apparatus includes a generally spherical hollow container having a liquid inlet arranged to direct fluid flow into the container in a direction tangential to the interior surface of the container and an outlet which includes a liquid diffuser. Filler means is also provided for introducing liquid soluble material.

BRIEF DESCRIPTION OF THE DRAWINGS

The invention may be more fully understood when the accompanying Detailed Description is read in conjunction with the following drawings.

DETAILED DESCRIPTION OF THE DRAWINGS

Figure 1:
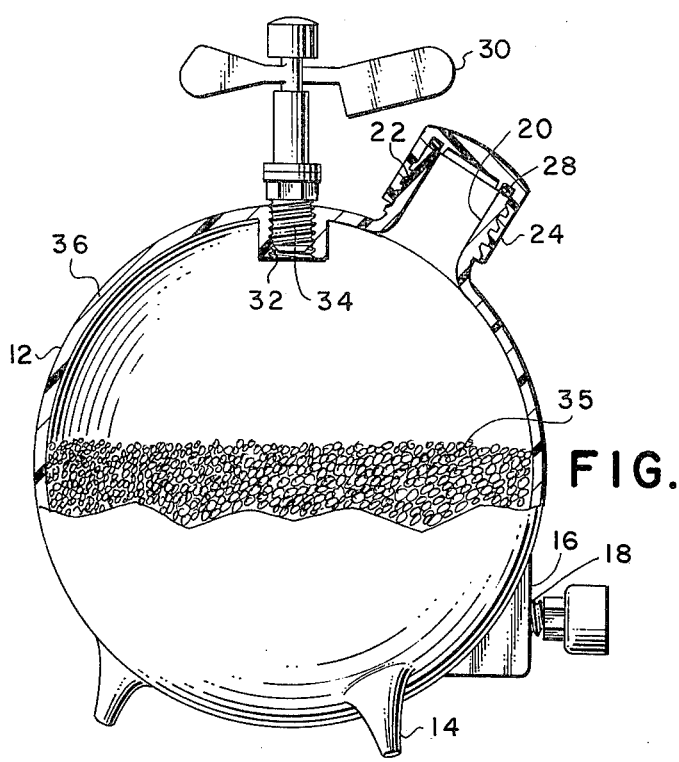
FIG. 1 is an elevational view, a portion of which is shown in vertical cross-section, of an embodiment of the invention having separate means for filling and dispensing materials.

Referring first to FIG. 1, there is shown a container 12 illustrated by its upper half being shown in cross-section. The container 12 is spherically shaped having a hollow interior. The container 12 is preferably constructed of a high tensile strength plastic material such as polypropylene or CELCON (a registered trademark of the Celanese Corporation). CELCON is a crystalline acetal co-polymer based on trioxane. A high strength material is necessary in order for the container to withstand high water pressures of city water systems. The container 12 rests on legs 14 to maintain it in an upright position. Located near the lower end of the container 12 is inlet 16 having a threaded aperture 18 therethrough. This inlet will be described in greater detail in FIGS. 2 and 3. In the upper half of the container 12 the container wall 36 is shown having a filler cap fitting 20 formed therein. The filler cap fitting 20 has a male threaded portion 22. The threads are indicated as being non-symmetrical to accomodate high stresses along the thread axis. The thrust side of the thread is approximately perpendicular to the thread axis, therefore the radial component of thrust is at a minimum. Filler cap 24 is shown threadedly engaged with the threaded portion 22 of filler cap fitting 20. The filler cap 24 should also be constructed of a high tensile strength plastic material such as CELCON.

An O-ring 28 is shown adjacent the upper end of the cap and should be constructed of a material to provide a watertight seal under pressure. O-rings of this type are readily available and are maintained as an off the shelf item. Also located in the wall 36 of the container 12 is an internally threaded container outlet 32. The outlet 32 is cylindrically shaped and is sized to accomodate commercially available impulse sprinklers. A plastic impulse sprinkler 30 is shown atop the container 12 and has a male threaded lower end 34 which engages the internal threads of container outlet 32. The container 12 as designed is intended for use in solubilizing and dispensing fertilizer, pesticides, herbicides, and soil conditioners. All the parts are preferably made of plastic because of the corrosive nature of these materials.

In the operation of the apparatus shown, the filler cap 24 is threadedly removed from the filler cap fitting 20 and the material is poured through the fitting 20 into the hollow interior of container 12. A garden hose attached to a source of water under pressure is threadedly connected with the inlet 16 with the aid of an adapter shown at 54 in FIG. 3. Water is introduced into the container 12 usually by the opening of a valve connected to a water source. The inlet 16 is designed to direct the water so that it rotates in a generally horizontal plane. As the water circulates in the interior of the container 12 it contacts the material 35 and solubilizes or mixes a portion thereof in its travel to the outlet 32. As the water exits outlet 32 it impinges and activates impulse sprinkler 30. The impulse sprinkler is designed upon activation to dispense and disseminate the water containing the desired materials over a large area of several hundred square feet. Since water pressure as supplied to residential neighborhoods ranges near 100 pounds per square inch, the container 12 must necessarily be designed to withstand substantial pressures. The spherical design of container 12 provides high strength and eliminates a build-up of pressure in a localized area.

As previously mentioned, inlet 16 is designed to direct entering water in a horizontal plane. In addition, the inlet 16 directs the water generally tangential to the inside wall of the container 12, thus imparting a vortex flow of water. The vortex flow acts to force granular material toward the outer horizontal edges of the container 12. By this procedure only solubilized fertilizer and water exit through container outlet 32 located on the axis of the vortex. If such a vortex flow is not utilized, fertilizer in particulate form will be forced to the outlet 32 and cause it to plug. If the inlet 16 directs water into the container 12 at right angles thereto, the water flow follows a polar orbit. When a polar orbit is created, the outlet 32 is immediately plugged. Additionally, the vortex flow enhances solubilization of particulate materials. Applicants unique design provides both a high strength container and creates a vortex flow to prevent plugging the outlet 32 and to enhance solubilization.

The construction of the fertilizer spreader can be accomplished by utilizing a single mold for rotationally molding the basic container 12 having inlet 16, cap filling 20, legs 14, and internally threaded outlet 32 formed therein. Plastic impulse sprinklers 30 and high strength filler caps 24 are commercially available for threadedly mounting on the container 12.

Figure 2:
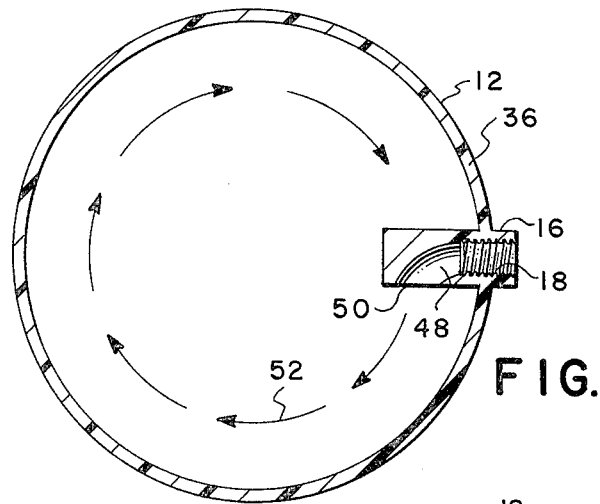
FIG. 2 is a cross-sectional plan view illustrating details of the inlet and directional flow of entering fluid.

FIG. 2 is a horizontal cross-section of the container 12 shown in FIG. 1. The horizontal cross-section is taken through inlet 16 to better illustrate its design. The inlet 16 of container 12 protrudes slightly from the exterior surface of wall 36 of container 12. The inlet 16 has an internal threaded portion 18 and a conduit 48 communicating the exterior environment to the interior of the container 12. The conduit 48 has an interior exit 50 formed in the portion of the inlet 16 located inside the container 12. Water entering the inlet 16 and following conduit 48 is directed by exit 50 such that it follows the pathway shown by arrows 52. The arrows 52 extend in a clockwise direction and upward movement is indicated by successively smaller arrows the greater distance they are from the inlet 16. The container 12 is sized such that large amounts of fertilizer 35 may be placed therein eliminating constant tending. Initial models of such a container 12 have usually been approximately a foot in diameter, and easily contain the normal water pressures which can be anticipated. To achieve such a size the container 12 can easily be formed by rotational molding. In order to use CELCON in such an application, the CELCON which comes normally in pellet form must be ground in thermoplastic grinding equipment. Such grinding permits a shorter rotational molding time which dramatically reduces the costs of rotational molding.

As shown in FIGS. 1 and 2 the container 12, legs 14, inlet 16, outlet 32 and filler cap fitting 20 are all rotationally molded in one continuous piece in a single molding operation. The cap 24 is one of several caps that are commercially available and are capable of containing high pressures. The impulse sprinkler 30 is a commercially available item and is made entirely of plastic. Thus, as designed, the container 12, cap 24, and impulse sprinkler 30 are all made of plastic material which are unaffected by the corrosive nature of fertilizers. Since this method of solubilizing and spreading particulate fertilizer is not affected by the corrosive nature of fertilizer, this apparatus will last much longer than present conventional fertilizer spreaders and will require little or no maintenance. An ultraviolet stabilizer should be added to the plastic material making the container 12. This will retard the loss of strength which ultraviolet rays cause in plastic materials.

Figure 3:
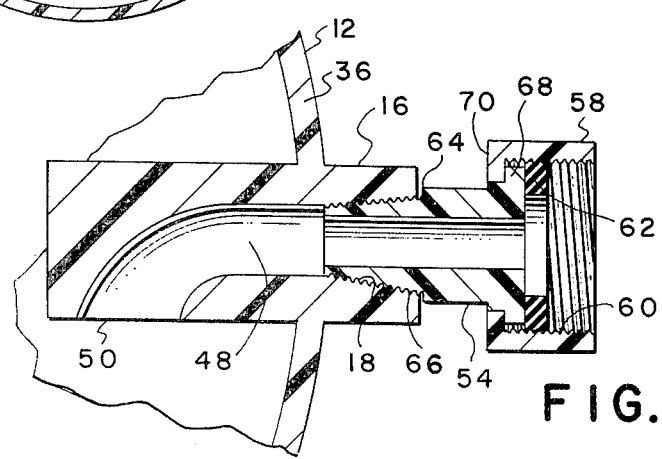
FIG. 3 is a horizontal section of the inlet including an attached water hose adapter.

Referring next to FIG. 3 there is illustrated a cross-sectional plan view of the inlet 16 shown in FIGS. 1 and 2 together with a water hose adapter 54. The inlet 16 is formed in the wall 36 of container 12 and protrudes into the interior of container 12 and extends exteriorally from the general outer surface of the container 12, a slight distance. The inlet 16 is cylindrically shaped and has a cylindrical conduit 48 formed therein. The cylindrical conduit 48 has an internally threaded portion 18 located adjacent the exterior portion of the inlet 16. The cylindrical conduit 48 also has a longitudinal axis which is generally at right angles to the vertical axis of the container in the portion adjacent the exterior portion of inlet 16. The conduit 48 then turns along a horizontal plane such that the a conduit outlet 50 is aligned to provide for liquids exiting therefrom to impinge on the interior wall of container 12 in a generally tangential manner.

A water hose adapter 54 is shown adjacent the exterior portion of the inlet 16 and has an externally threaded end 66 engaging the threaded aperture 18 of inlet 16. The threaded end 66 of water hose adapter 54 is generally cylindrical and has a cylindrical passageway therethrough. Adjacent the threaded end 66 of water hose adapter 54 is an enlarged diameter portion 64 which is also cylindrically shaped and has an annular flange portion 68. The water hose adapter 54 has a hose engaging portion 58 which is cylindrically shaped and has interior threads 60 sized to receive the male end of a conventional water hose. The hose engaging portion 58 of water hose adapter 54 also has an annular flanged end 70. This annular flanged end 70 is sized to overlap the annular flange 68 of the enlarged diameter portion 64 of water hose adapter 54. The hose engaging portion 58 is sized to freely rotate relative to the remaining portion of water hose adapter 54. A conventional soft washer 62 shown engaging the annular flange 68 of the enlarged diameter portion 64 of water hose adapter 54 is sized to provide a watertight seal when the hose end presses it against the flange 68 and threads 60. The water hose adapter 54 is preferably also constructed of a plastic material to prevent corrosion by the action of water or fertilizer.

The container 12 is connected with a water supply by way of a conventional water hose by rotatably engaging the male threaded end of the garden hose with the female thread 60 of the water hose engaging portion 58 of water hose adapter 54. When the threaded engagement is tightened the hose end is tightened against the soft washer 62 which is compressed against the annular flange 68 of the enlarged diameter portion 64 of water hose adapter 54. In addition, as the threaded attachment is tightened, the annular flanged end 70 of the hose engaging portion 58 of water hose adapter 54 tightens against the annular flange 68. In this manner, a watertight seal is accomplished. When the hydrant is turned on, water under pressure passes through the interior of water hose adapter 54 through the annular conduit 48 and exits the inlet 16 by way of conduit outlet 50. The water exiting conduit outlet 50 is directed into the interior of container 12 so that it strikes the interior wall surface of container 12 in a tangential manner. As previously described water entering the container 12 in this manner will create a vortex flow which forces the granular fertilizer against the wall of the container thereby preventing plugging of the container outlet with unsolubilized fertilizer.

Figure 4:
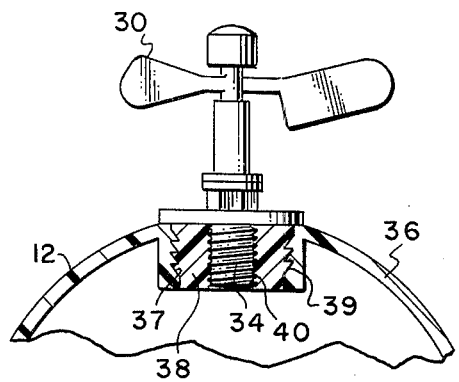
FIG. 4 is an elevational view of an embodiment of the invention which combines the filling and dispensing portions of the invention.

Referring next to FIG. 4 there is seen an alternative embodiment of Applicant's invention which combines the filling and dispensing portions of the container 12. The upper end of the container 12 is shown in vertical cross section and has a threaded cylindrical opening 37 at the top of the container. The internally threaded portion of the opening 37 is shown engaging external threads 39 of a cylindrical plug 38. The plug 38 has an internally threaded cylindrical passageway 40 therethrough sized to accomodate the external threads 34 of the lower end of an impulse sprinkler 30. The plug 38 must be made of a material which is not subject to creep while in compression. Correspondingly the threads in threaded opening 37 should also not be subject to creep in compression as the plug 38 would tend to blow out in response to water pressure if the threads are susceptible to creep. Creep is defined as a deflection of the plastic material under pressure which in this instance results in a disengagement of the threaded connection. CELCON has a high resistance to creep and can be utilized to prevent water pressure from blowing out the plug 38. This design of the invention permits the elimination of a separate filling mechanism and dispensing outlet. In the operation of filling the container 12 with fertilizer the plug 38 together with the attached impulse sprinkler 30 is removed. Fertilizer is introduced into the container through the threaded opening 37. Once fertilizer has been placed in the container 12 the plug 38 together with attached impulse sprinkler 39 is replaced in threaded opening 37 and the fertilizing process utilized in the description of FIG. 1 can be used.

Figure 5:
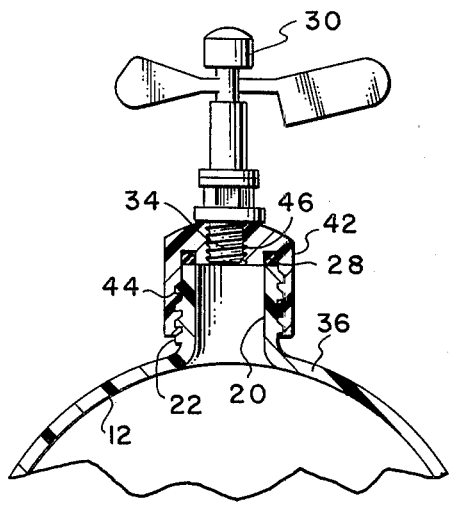
FIG. 5 is an alternate embodiment of the combined filling and dispensing portions of the invention.

Referring next to FIG. 5 there is illustrated an alternative embodiment which combines a filler cap with a threaded outlet for receiving an impulse sprinkler. At the upper end of container 12 there is formed in container wall 36 a filler cap fitting 20 which has a threaded portion 22. These threads 22 are designed to withstand high pressure in the manner described in FIG. 1. A combination filler cap 42 having internal threads 44 is threadedly engaged with the threaded portion 22 of filler cap fitting 20. A commercially available soft washer 28 is positioned adjacent the upper threads 22 of filler cap fitting 20. The combination filler cap 42 has an internally threaded opening 46 which is sized to engage an impulse sprinkler 30. Such an impulse sprinkler 30 has been shown threadedly engaged with the internal threads of opening 46. The materials used in these various parts are high strength plastic materials as previously described in FIG. 1. The impulse sprinkler 30 can be one of several commercially available plastic impulse sprinklers.

In the use of this embodiment of the fertilizer spreader the combination filler cap 42 with attached impulse sprinkler 30 is rotatably removed from the container 12. Fertilizer is introduced into the container 12 through the opening in the filler cap fitting 20. When the container 12 has been charged with fertilizer the combination filler cap 42 together with engaged impulse sprinkler 30 is rotatably attached to the container 12. As previously described in FIG. 1, the fertilizer is disseminated by introducing water into the container 12 where it is solubilized and forced through the fitting 20 and into contact with the impulse sprinkler 30 which disseminates the solubilized fertilizer in the conventional manner. This embodiment simplifies the design of the container 12. Slight modifications of the embodiment shown in FIGS. 1, 4 and 5 would permit dissemination of the fertilizer in other manners. For example, a garden hose fitting could be threadedly engaged with the container outlet 32 of FIG. 1 or the internally threaded passageway 40 of plug 38 in FIG. 4 or the internal threads 46 of combination filler cap 42 shown in FIG. 5. Such water hose fitting will permit coupling another garden hose to the container 12 to allow the connection of other sprinkler devices which would preferably be made of a non-corrodable plastic material.

Use of Applicant's invention permits dispensing and watering in fertilizer in one continuous operation requiring little manual effort. Additionally, uniform distribution can be achieved preventing varying lawn tones which occur with present apparatus unless great care is used.

While particular embodiments of the invention have been shown and described, it is apparent that changes and modifications may be made without departing from this invention in its broader aspects, therefore, the aim in the appended claims is to cover all such changes and modifications as fall within the true spirit and scope of this invention.

What is claimed is:

1. Apparatus for solubilizing and dispensing liquid soluble particulate material, comprising: a generally spherical hollow container; inlet means located in the lower half of the spherical container for introducing liquids into the spherical container and arranged to direct liquid flow into the container in a horizontal direction, generally tangential to the interior surface of the hollow container wall, so as to create a vortex flow of the introduced liquid; outlet means located in the top portion of the spherical container which includes liquid diffusing means; and filter means for introducing soluble particulate material.

2. The apparatus of claim 1 wherein the inlet means includes a hose attachment fitting sized to threadedly attach a standard garden hose, and wherein the outlet liquid diffusing means includes an impulse sprinkler threadedly attached to the container.

3. The apparatus of claim 2 wherein the container wall has a threaded aperture sized to threadedly attach the impulse sprinkler, and wherein the filler means includes an externally threaded cap fitting extending away from the spherical portion of the container, and a cap sized to threadedly attach to the cap fitting.

4. The apparatus of claim 1 wherein the liquid diffusing means comprises an impulse sprinkler threadedly attached to the container and wherein the inlet means includes a threaded rotatable fitting sized to receive a standard garden hose.

5. The apparatus of claim 3 wherein the container, container wall threaded aperture and cap fitting are made of a high strength plastic material and are molded as a single unit.

6. The apparatus of claim 5 wherein the inlet means includes a cylindrical conduit extending from the exterior to the interior of the container, and wherein the exterior end of the cylindrical conduit is threadedly attached to and adapter means, and wherein the interior end of the cylindrical conduit is angled to direct fluid exiting therefrom generally tangential to the interior wall of the hollow container.

7. The apparatus of claim 1 wherein the container includes a threaded aperture through the wall of the container, and including a plug threadedly attached to the container aperture and capable of being disengaged from the container, and wherein the outlet means includes a female threaded aperture through the plug and wherein the sprinkling and diffusing means is threadedly connected with the threaded plug aperture.

8. The apparatus of claim 1 wherein the filler means includes an externally threaded fitting extending away from the spherical container and including a cap threadedly and removably attached to the filler means fitting and wherein the outlet means comprises a female threaded aperture through the cap, and wherein the liquid diffusing means comprises an impulse sprinkler threadedly attached to the cap aperture.

9. The apparatus of claim 1 wherein the outlet means includes a threaded passageway through the wall of the container; wherein the liquid diffusing means is threadedly attached with the outlet means; wherein the filler means comprises an aperture through the wall of the container, an externally threaded passageway extending away from the spherical container and a cap threadedly removably connected with the externally threaded filler means passageway; and wherein the inlet means includes an aperture through the wall of the container, an internally threaded passageway extending exteriorally from the spherical container, and adapter means threadedly attached with the threaded portion of the inlet means passageway which adapter means is capable of connecting with a standard garden hose.

10. The method of solubilizing and spreading particulate fertilizer comprising: placing the particulate fertilizer in a spherical plastic container capable of containing 100 psi; continually introducing water under pressure into the lower portion of the spherical container at an angle to the vertical axis of the container to impose a vortex flow of water; and continuously withdrawing and diffusing water solubilized fertilizer from the upper end of the container.

* * * * *

UNITED STATES PATENT OFFICE
CERTIFICATE OF CORRECTION

PATENT NO. : 3,933,308
DATED : January 20, 1976
INVENTOR(S) : W. S. Bradley, et al It is certified that error appears in the above-identified patent and that said Letters Patent are hereby corrected as shown below:

Claim 1, line 11, delete "filter" and substitute --filler--.

Claim 6, line 5, delete "and" (first occurrence" and substitute --an--.

Signed and Sealed this

Seventh Day of September 1976

[SEAL]

Attest:

RUTH C. MASON
Attesting Officer

C. MARSHALL DANN
Commissioner of Patents and Trademarks